United States Patent [19]
Yokajty et al.

[11] Patent Number: 5,805,935
[45] Date of Patent: Sep. 8, 1998

[54] TWO ROLLER FILM SCROLLER AND METHOD

[75] Inventors: Joseph Yokajty, Webster; Matthew Stanzione, Spencerport; Joseph A. Watkins, Rochester, all of N.Y.

[73] Assignee: Eastman Kodak Company, Rochester, N.Y.

[21] Appl. No.: 866,866

[22] Filed: May 30, 1997

[51] Int. Cl.⁶ .................................................. G03B 17/02
[52] U.S. Cl. ............................................ 396/6; 242/538.4
[58] Field of Search ................................ 396/6, 387, 411, 396/418, 429, 661; 242/538, 538.2, 538.4, DIG. 3

[56] References Cited

U.S. PATENT DOCUMENTS

| | | |
|---|---|---|
| 651,118 | 6/1900 | Pascal et al. . |
| 1,921,559 | 8/1933 | Case . |
| 1,921,560 | 8/1933 | Case . |
| 2,484,248 | 10/1949 | Roehrl . |
| 3,057,573 | 10/1962 | Kindig et al. . |
| 3,288,389 | 11/1966 | Gersch et al. . |
| 3,383,064 | 5/1968 | Daly et al. . |
| 3,567,147 | 3/1971 | Engelsmann et al. . |
| 3,643,889 | 2/1972 | Krause . |

(List continued on next page.)

FOREIGN PATENT DOCUMENTS

| | | |
|---|---|---|
| 0743 546 A1 | 11/1996 | European Pat. Off. . |
| 0 750 216 A1 | 12/1996 | European Pat. Off. . |
| 38-20424 | 10/1963 | Japan . |
| 9-43778 | 2/1987 | Japan . |
| 63-271325 | 11/1988 | Japan . |
| 3-2741 | 1/1991 | Japan . |
| 3-2751 | 1/1991 | Japan . |
| 3-2752A | 1/1991 | Japan . |
| 5-134361 | 5/1993 | Japan . |
| 5-323517 | 12/1993 | Japan . |
| 6-130568A | 5/1994 | Japan . |
| 6-289541 | 10/1994 | Japan . |
| 6-295020 | 10/1994 | Japan . |
| 6-295022 | 10/1994 | Japan . |
| 6-332118 | 12/1994 | Japan . |
| 7-13279 | 1/1995 | Japan . |
| 7-5526 | 1/1995 | Japan . |
| 7-209721 | 8/1995 | Japan . |
| 7-219156 | 8/1995 | Japan . |
| 8-171180 | 7/1996 | Japan . |
| 8-171181 | 7/1996 | Japan . |
| 8-262633 | 10/1996 | Japan . |
| 8-262636 | 10/1996 | Japan . |
| 8-314071 | 11/1996 | Japan . |
| 9-43777 | 2/1997 | Japan . |
| 9-43779 | 2/1997 | Japan . |
| 558515 | 1/1944 | United Kingdom . |
| 1060937 | 3/1967 | United Kingdom . |

OTHER PUBLICATIONS

U.S. Patent Application Serial No. 08/569,634 filed 08 Dec. 1995 (now U.S. Patent 5,689,745, issued Nov. 18, 1997).

U. S. Patent Application Serial No. 08/607,844 filed 27 Feb. 1996.

*Primary Examiner*—Howard B. Blankenship
*Attorney, Agent, or Firm*—Robert Luke Walker

[57] ABSTRACT

A method and apparatus for loading photographic film. In the method, a curling guide is introduced into a supply chamber of a film holder. An inner roller is introduced into the supply chamber. The inner roller defines an inner roller axis and a film gap overlying the inner roller. An outer roller is disposed over the inner roller adjoining the film gap. A leading portion of a filmstrip is advanced through the film gap. The leading portion is curled around the inner roller and back to the film gap to define an initial filmstrip scroll. The initial scroll has an axis offset from the inner roller axis. The curling guide is retracted after the curling step. The main portion of said filmstrip is propelled through the film gap to wind the main portion of the filmstrip over the initial scroll. The rollers are removed. The film holder is light-tightly closed.

25 Claims, 13 Drawing Sheets

U.S. PATENT DOCUMENTS

| | | |
|---|---|---|
| 3,748,715 | 7/1973 | Hoover et al. . |
| 3,850,381 | 11/1974 | Moore . |
| 3,925,798 | 12/1975 | Sanada et al. . |
| 3,930,296 | 1/1976 | Hoover . |
| 3,999,197 | 12/1976 | Iwashita et al. . |
| 4,102,512 | 7/1978 | Lewallyn . |
| 4,171,892 | 10/1979 | Kozuki et al. . |
| 4,205,436 | 6/1980 | Klotz et al. . |
| 4,228,579 | 10/1980 | Dunkel et al. . |
| 4,251,148 | 2/1981 | Stemme et al. . |
| 4,256,269 | 3/1981 | Feighery et al. . |
| 4,274,726 | 6/1981 | Yoneyama et al. . |
| 4,303,325 | 12/1981 | Seely . |
| 4,342,509 | 8/1982 | Wakabayashi et al. . |
| 4,451,011 | 5/1984 | Engelsmann et al. . |
| 4,455,074 | 6/1984 | Wong et al. . |
| 4,687,311 | 8/1987 | Desormeaux . |
| 4,699,489 | 10/1987 | Nii . |
| 4,833,495 | 5/1989 | Ohmura et al. . |
| 4,838,497 | 6/1989 | Kramer et al. . |
| 4,884,087 | 11/1989 | Mochida et al. . |
| 4,890,130 | 12/1989 | Takei et al. . |
| 4,954,857 | 9/1990 | Mochida et al. . |
| 4,965,616 | 10/1990 | Horiuchi . |
| 4,972,649 | 11/1990 | Mochida et al. . |
| 5,016,833 | 5/1991 | Hamlin . |
| 5,049,908 | 9/1991 | Murakami . |
| 5,063,400 | 11/1991 | Takei et al. . |
| 5,125,630 | 6/1992 | Hoyt et al. . |
| 5,131,592 | 7/1992 | Shibata et al. . |
| 5,257,748 | 11/1993 | Morizzo . |
| 5,301,892 | 4/1994 | Merz et al. . |
| 5,311,231 | 5/1994 | Suzuki et al. . |
| 5,544,833 | 8/1996 | Zander . |
| 5,608,482 | 3/1997 | Watkins et al. . | ived, 5,805,935

TWO ROLLER FILM SCROLLER AND METHOD

FIELD OF THE INVENTION

The invention relates to photographic equipment and more particularly relates to methods and apparatus for loading film in a camera body or body subassembly.

BACKGROUND OF THE INVENTION

Singe use cameras are commonly sold preloaded with a cartridge of film. In order reduce complexity and costs, a rewind mechanism is omitted from the camera. Instead, the film is prewound and during use is advanced back into the film canister. A number of approaches have been followed in loading and prewinding film cartridges for single use cameras. In some approaches, such as one taught in U.S. Pat. No. 4,972,649; film is prewound into a roll outside the camera body and then loaded. A shortcoming of these approaches is that the film roll must be handled after it is formed. This presents a risk of film damage and may add complexity to necessary equipment. In some other approaches, also taught in U.S. Pat. No. 4,972,649; the cartridge is loaded, the camera is light-tightly closed, and the film is then prewound. In still other approaches, such as taught by U.S. Pat. No. 5,311,231; the cartridge is loaded and then the rear opening of the camera body is closed and the film is prewound through a bottom opening, which is later sealed. The latter two approaches have the shortcoming that film guiding is provided primarily by the camera body, rather than loading apparatus. This places constraints on the camera body in terms of required tolerances and the like and may, in addition, slow throughput speeds. Still another approach is taught by Japanese Kokai 6-295022, European Patent Application No. 0743546-A, and Japanese Kokai 8-171180. In this approach, the film is wound onto a second spool, rather than being wound into a film roll. The back of the camera is not mandatory for guiding the film, since the second spool tends to restrain the film.

A common feature of the above in-camera film winding procedures is the use of an axial winding support, onto which the film is cinched prior to winding. Cinching the film increases the risk of crimping or other deformation of the leader. In some cases the support is a removable quill or mandrel. In the other cases, the support is a spool that is retained in the camera, rather than being removed. The quill has the shortcoming that the film must be decinched, i.e., released from the quill, prior to removal of the quill. The spool avoids this problem, but has the shortcoming of requiring an additional part. With inexpensive cameras, this is a significant expense. On the other hand, axial film winding with a quill or spool provides a positive connection to the film that avoids film slippage and the attendant risks of film scuffing or incomplete film loading or both.

It would thus be desirable to provide an apparatus and method in which film is wound into a scroll without a quill or spool, and film slippage is substantially avoided.

SUMMARY OF THE INVENTION

The invention is defined by the claims. The invention, in its broader aspects, provides a method and apparatus for loading photographic film. In the method, a curling guide is introduced into a supply chamber of a film holder. An inner roller is introduced into the supply chamber. The inner roller defines an inner roller axis and a film gap overlying the inner roller. An outer roller is disposed over the inner roller adjoining the film gap. A leading portion of a filmstrip is advanced through the film gap. The leading portion is curled around the inner roller and back to the film gap to define an initial filmstrip scroll. The initial scroll has an axis offset from the inner roller axis. The curling guide is retracted after the curling step. The main portion of said filmstrip is propelled through the film gap to wind the main portion of the filmstrip over the initial scroll. The rollers are removed. The film holder is light-tightly closed.

It is an advantageous effect of at least some of the embodiments of the invention that an apparatus and method are provided in which film is wound into a scroll without a quill or spool, and film slippage is substantially avoided.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
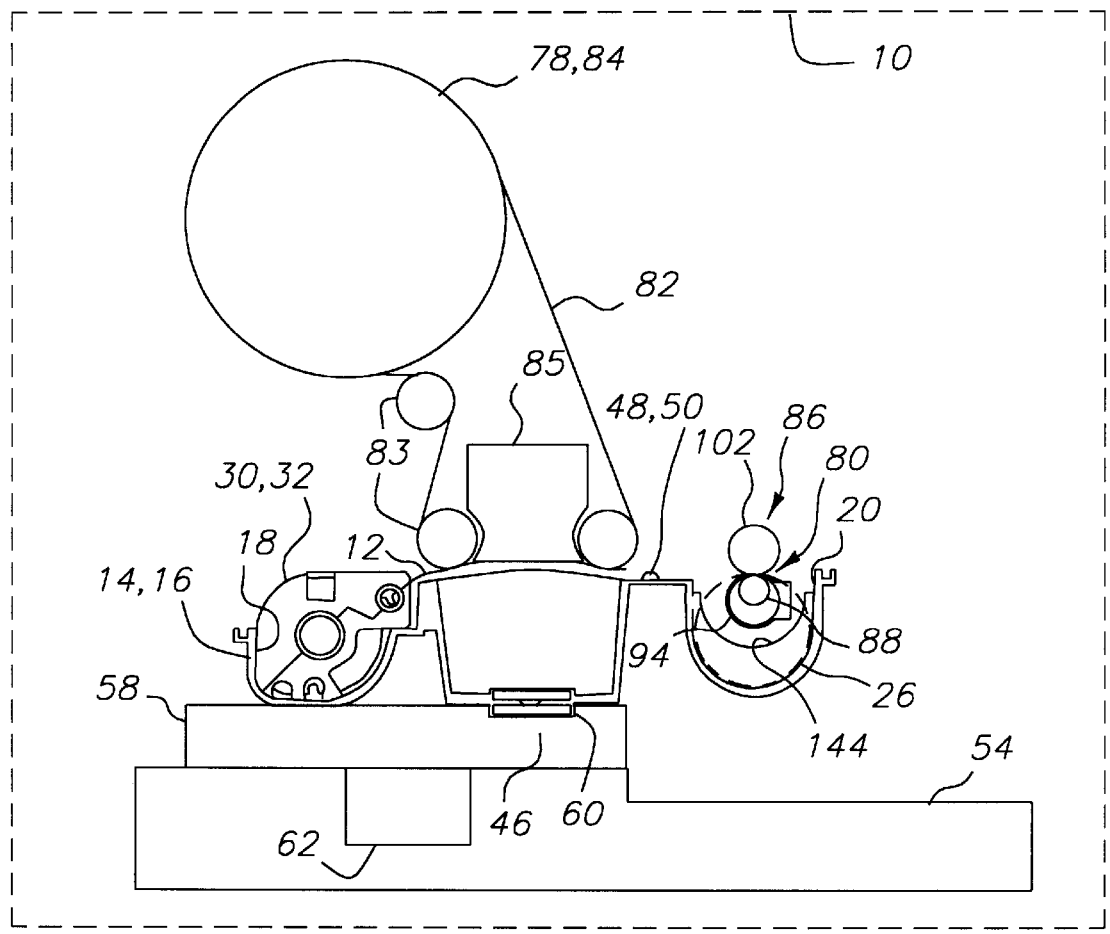
FIG. 1 is a semi-diagrammatical view of an embodiment of the apparatus of the invention, showing a receiver and film bridge. A pallet rests on the receiver. The pallet bears a camera frame assembly (shown in cross-section) and a cartridge. The film space is indicated by dashed lines. The film space axis is indicated by a cross. The invention is not limited to a particular camera frame assembly and various alternative camera frame assemblies are illustrated in the figures.

Referring initially to FIGS. 1–6, in the apparatus 10 of the invention, a filmstrip 12 is prewound in a camera frame assembly 14, that is, a camera or incomplete camera subunit, in a darkroom. The camera frame assembly 14 includes a camera frame 16 having a cartridge chamber 18 and a supply chamber or scroll chamber 20. The cartridge and supply chambers 18,20 each have a rearwardly facing throat or opening 15,17, respectively. The supply chamber 20 has a side opening 19 that is continuous with the throat 17. Opposite the side opening 19 is a second side opening or an end wall 21. The camera frame 16 has an intermediate section or exposure frame 22 between the chambers 18,20. The supply chamber 20 has a concave interior wall 24 that defines a substantially cylindrical, internal film space 26. The frame assembly 10 lacks a film spool or other axial film support, thus the films space 26 is empty, and remains empty after loading, except for the film roll. The frame assembly 10 defines a rear opening or rear accessway (indicated by dashed line 28 in FIG. 2) over the supply chamber 20 and, preferably over both chambers 18,20 and the intermediate section 22.

A film cartridge 30 loaded into the frame assembly 14 includes a canister 32, a spool 34, and the filmstrip 12. The filmstrip 12 has a leading portion 38 having a free end 40, a tail portion or trailing portion 42, which is attached to the spool 34 in the canister 32, and a main portion 44 between the leading and tail portions 38,42.

The camera frame assembly 14 can also include other camera components which have been previously installed on the camera frame 16. For example, the camera frame assembly 14 can include an exposure system 46, including one or more sub-components such as a baffle, a lens system, and a shutter. The frame assembly 14 can include a camera film drive 48 having a film engagement member (indicated diagrammatically in FIG. 2 by a semicircle 50) which adjoins the intermediate section 22 and engages film perforations (not shown) for film metering or both film metering and film transport. A variety of such camera film drives are well known to those of skill in the art. In such drives, the film engagement member can be a linearly reciprocated pawl; however, a sprocket is more commonly used as the film engagement member. In many film drives for type 135 (35 mm.) film, the sprocket is a continuously toothed wheel. The sprocket rotates with film movement; but, at all times, part of the sprocket extends rearward from the intermediate section. In some film drives for APS film, for example, in Japanese Kokai 7-5526, filed Jun. 14, 1993, the film engagement member is a skater or incompletely toothed sprocket in which an oval wheel has a pair of teeth at each end of the long axis and a toothless portion at each end of the short axis. With some film transport mechanisms, such as conventional sprocket types, it is necessary to lift film above the sprocket or other film engagement member during prewinding. With other film transport mechanisms, such as some skater types, the film can move past the skater or other film engagement member without causing it to rotate or otherwise actuate. The apparatus and method of the invention, in different embodiments, can accommodate either type of film transport mechanism.

Figure 4:
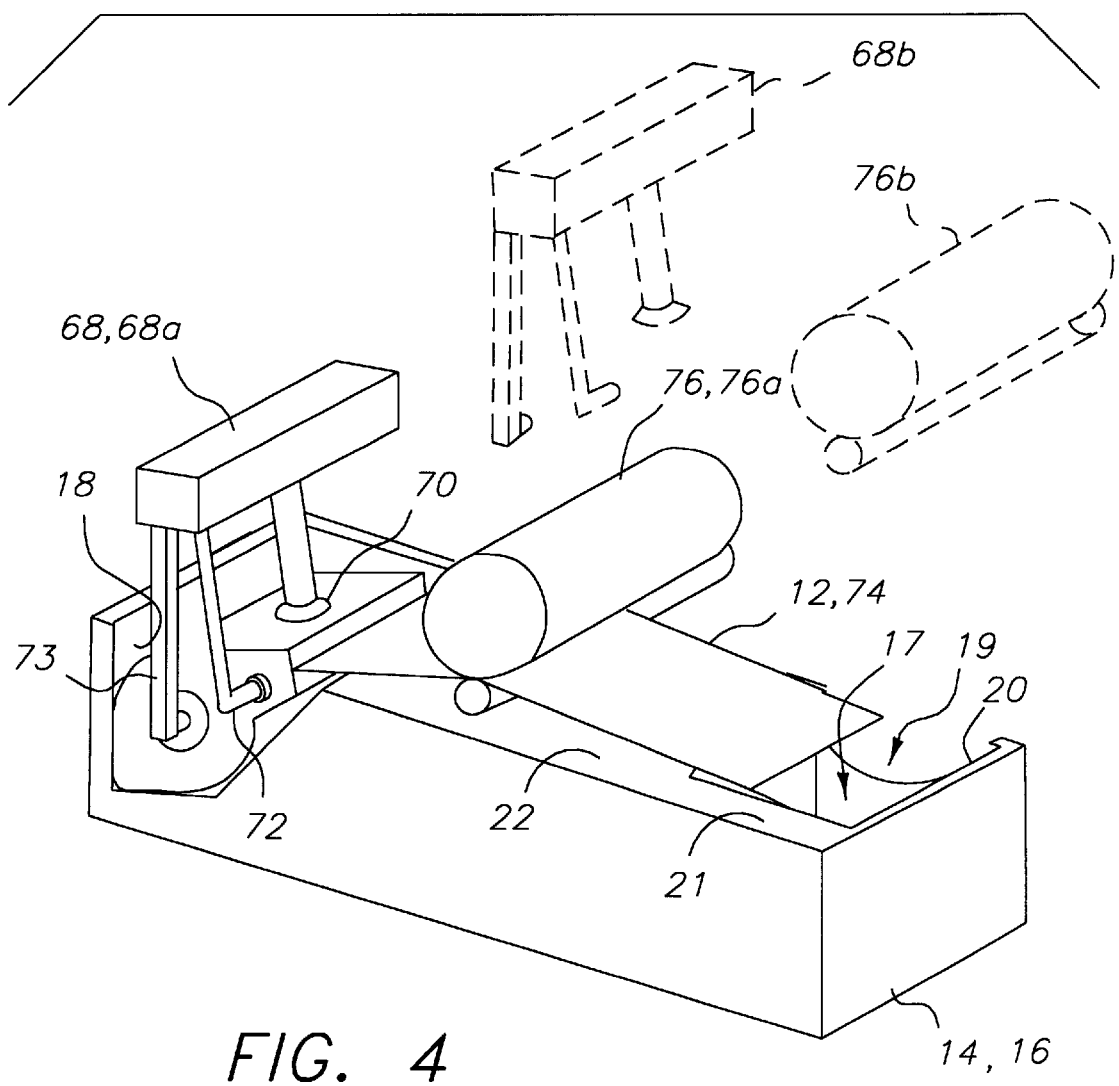
FIG. 4 is a semi-diagrammatical perspective view of still another embodiment of the apparatus and camera assembly of the invention. For clarity, the receiver and film scroller are not shown and the bottom of the cartridge chamber has been deleted. The film bridge and cartridge mover are shown in a use position in solid lines and in a rest position in dashed lines.

The apparatus 10 of the invention includes a receiver 54, and active components 56 for cartridge loading, film transporting, and film scrolling. The receiver 54 supports the camera frame assembly 14 in a predetermined loading position 14a or series of positions 14a relative to the active components 56. The receiver 54 has a predetermined relationship to other components 56 and thus, during assembly, defines a predetermined relative location or site for each of the chambers, throats, intermediate section 22, films space 26, and rear opening 28. (Sites correspond to features of the frame assembly and are necessarily predetermined for a particular frame assembly by adjusting physical constraints such as relative positions of the receiver 54 and other components 56 of the apparatus 10. In FIG. 4, representative sites are indicated in dashed lines and by references numbers identical to those of similarly named frame assembly features, but with the letter "a" added.) The receiver 54 can accept the camera frame assembly 14 directly or can be adapted to accept a pallet or nest 58 or the like. In that case, the camera frame assembly 14 is held in a predetermined relation to the pallet 58, which in turn in held in a predetermined loading orientation by the receiver 54. Indexing features 60 can be provided on the pallet 58 to permit the camera frame assembly 14 and the receiver 54 to be readily aligned. The frame assembly 14 can be provided to the receiver 54 premounted on a pallet 58 or the pallet 58 and frame assembly can combined on the receiver 54.

Figure 5:
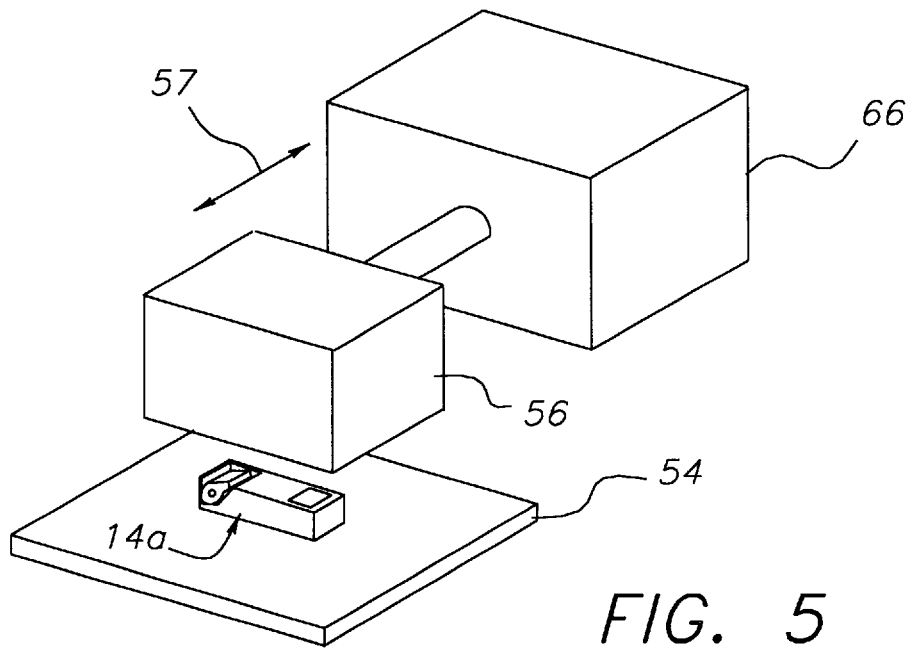
FIG. 5 is a semi-diagrammatical perspective view of another embodiment of the apparatus of the invention.

The receiver 54 can have a variety of features for supporting automated assembly operations. For example, the receiver 54 can include a movement system or positioner 62, for moving a camera frame assembly 14 between the apparatus 10 of the invention and one or more other assembly stations 64 or between stations 64 having different components 56 of the apparatus 10 of the invention. For example, in FIG. 1, the positioner 62 (illustrated schematically) can be a conveyor or track for moving the camera frame assembly 14 in directions perpendicular to the plane of the figure. The apparatus components 56 can each include an actuation mechanism 66 such as a retraction-extension unit to allow the component 56 to extend to an active position for use and to retract to a store position clear of the movement system 62 between actuations. (Directions of movement for one component 56 are indicated in FIG. 5, by double-headed arrow 57.) The actuation mechanism 66 can also include other parts for imparting motion to components 56, such as rotary or linear drives. As a matter of convenience, the following discussion generally treats the receiver 54 as being static relative to other components 56 of the apparatus 10 of the invention.

Referring now primarily to FIG. 4, the apparatus 10 can include a cartridge mover 68 for positioning the cartridge 30 in the cartridge chamber site. The cartridge mover 68 can be simply a pick and place mechanism or can provide additional functions. In the embodiment of the invention shown in FIG. 3, the cartridge mover 68 has a vacuum gripper 70 which allows the cartridge mover 68 to position the cartridge 30 in the site of the cartridge chamber 18. The vacuum gripper 70 or a holddown (not shown) can be used to retain the cartridge 30 in the cartridge chamber 18 during film winding, if the camera frame assembly 14 lacks features to prevent oscillation or other movement. In this embodiment, the cartridge mover 68 also supports an active light lock opener 72 and a spool rotator 73. The active light lock opener 72 pivots to open the active light lock of a suitable film cartridge 30, such as an Advanced Photo System™ (APS™) cartridge, prior to placement of the cartridge in the cartridge chamber site. This allows the camera frame assembly 14 to include a detent (not shown) which retains the active light lock in the open position prior to cartridge removal for processing. The spool rotator 73 engages the spool of the APS cartridge and rotates the spool to thrust film from the cartridge.

The apparatus 10 defines a film path 74 extending from the site of the cartridge chamber 18 to the site of the supply chamber 20. (In FIGS. 1–2, 4, the film path 74 is occupied by the filmstrip 12; and a film bridge 76 is disposed over the intermediate section 22 and defines parts of the film path 74.) The apparatus 10 has a film transport 78, disposed in operative relation to the film path 74, to propel the filmstrip 12 along the film path 74 to a film gap 80 (discussed in detail below). The film transport 78 can use a driven roller, or belt, or other conventional film transport device (not separately illustrated) to move the film along the film path 74. With a thrust-type film cartridge, a spool rotator, like that previously discussed, can also be utilized.

The use of a film bridge 76 is preferred in embodiments of the invention in which the camera film drive 48 has a film engagement member 50, such as a conventional sprocket, that continually extends into the intermediate section 22. The film bridge 76 causes the film path 74 to be spaced apart from the intermediate section 22 site and separates the filmstrip 12 from the camera film drive 48, which thus does not need to be disabled or the like during scroll formation. In some other embodiments, the film engagement member 50 of the camera film drive 48, is a skater or the like and can be positioned so as to not extend into the intermediate section 22 during film winding. In these embodiments the use of a film bridge 76 is not mandatory, since film winding through the intermediate section 22 will pass freely over the film engagement member 50. A frame assembly having film retention fingers can be used. Such a frame assembly is disclosed in U.S. patent application Ser. No. 08/796,155, entitled "ONE-TIME-USE CAMERA HAVING MAIN BODY PART AND INSERTABLE LIGHT BAFFLE WITH FILM HOLDERS TO FACILITATE CAMERA ASSEMBLY", filed Feb. 6, 1997, by Douglas H. Pearson, which is hereby incorporated herein by reference. The film retention fingers define and guide the filmstrip along part of the film path: a film entrance leading into the supply chamber.

Figure 2:
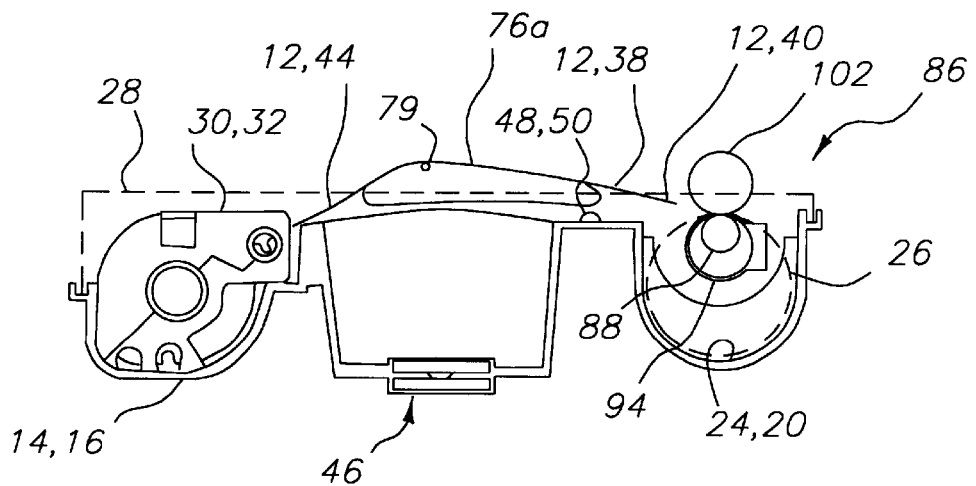
FIG. 2 is the same view of the camera frame assembly as shown in FIG. 1, but with the film bridge of an alternative embodiment of the invention.

The film bridge 76 can take a variety of forms. For example, the film bridge 76 can be a turtleback 76a as shown in FIG. 2. It is preferred that the turtleback 76a present minimal friction to the filmstrip 12. The turtleback can provide one or more friction reducing features (indicated by item 79 in FIG. 2); such as holes and a pressurized gas connection to create an air cushion or rotary bearings.

Figure 3:
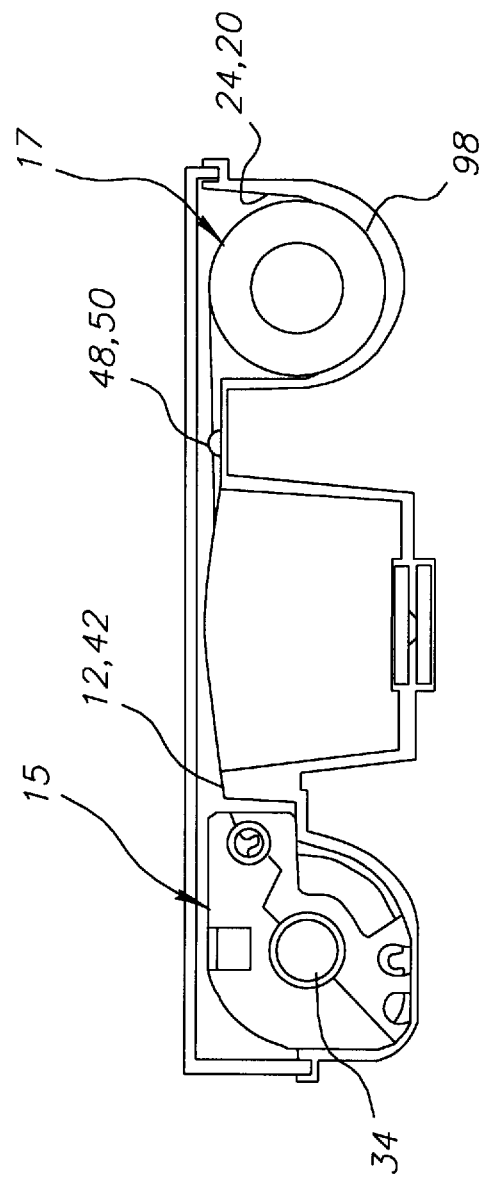
FIG. 3 is the same view of the camera frame assembly as shown in FIG. 2, after film scrolling and installation of the back cover closing the rear opening.

It is highly preferred that the film bridge 76 include the film transport 78 to propel the filmstrip 12 across the film bridge 76 to the supply chamber 20. Examples of film bridges 76 that include a film transport 78 include a capstan drive, as shown in FIG. 3; a vacuum shuttle, such as that disclosed in U.S. Pat. No. 5,125,630; and an endless belt mechanism, as shown in FIG. 1. The endless belt 82 can be disposed between the filmstrip 12 and the intermediate section 22 of the camera frame assembly 14 or, as shown in FIG. 1 can overlay the filmstrip 12. The mechanism 42 includes a belt drive 84 and idlers 83 which position and tension the belt 82. An endless belt 82 overlying the filmstrip 12 can have holes (not shown) and include a vacuum-compressed gas unit 85 which provides a vacuum to pull the filmstrip 12 against the belt 82 for transport, and directs compressed gas against the filmstrip 12, or uses gravity to release the filmstrip 12 from the belt 82. The film bridge 76 can be permanently positioned relative to the receiver 54 or a positioner 62 can be provided for moving the film bridge 76 relative to the receiver 54, between a use position over the intermediate section site and a rest position spaced apart from the use position. A cartridge mover 68 or other component, such as a film bridge 76 can be repositioned in the same manner; between active and rest positions 68a,76a and 68b,76b, respectively.

Referring now primarily to FIGS. 1, 2, and 7–13d; a scroll former 86 can be mounted so as to move between a use position and a rest position in the same manner as the film bridge 76 and cartridge mover 68, either with the other components 56 or independently. The scroll former 86 includes an inner roller 88 which has a longitudinal axis of rotation 90. The inner roller 88 is mounted to an inner roller drive 92 that rotates the inner roller 88 about the axis of rotation 90. The inner roller 88 is movable between a rest position outside the supply chamber 20 and a use position inside the supply chamber 20. The inner roller 88 is connected to a locator or actuation mechanism 66 that is a linear actuator or the like for movement of the inner roller 88 between the two positions. It is preferred that the movement of the inner roller 88 is in directions parallel to the axis of rotation 90 of the inner roller 88, since this minimizes the space needed in the supply chamber 20. In particular embodiments of the invention, the locator also provides for movement of the inner roller 88 deeper into the supply chamber 20 during scrolling. Suitable drives, linear actuators and the like for the locator 66 and for mechanisms for movement of the inner roller 88 and other parts of the scroll former 86 are well known to those of skill in the art.

The scroll former 86 includes a curling guide 94 that is mounted to a locator 66 for movement, independent of the inner roller 88, between a first position outside the supply chamber 20 and a second position inside the supply chamber 20 and spaced apart from the interior wall 24. The movement of the curling guide 94 as it is introduced and withdrawn from the supply chamber 20 is in directions parallel to the inner roller axis 90.

The curling guide 94 directs the free end 40 of the leading portion 38 of the filmstrip 12, away from the film gap 80 along a cylindrical path and back to the film gap 80. The curling guide 94 can be a single piece or multiple pieces, but it is preferred that the curling guide 94 is configured such that the free end 40 of the filmstrip 12 is unlikely to catch or snag. A convenient shape for the curling guide 94 is that of a partial sleeve with a smooth or other low friction inner surface. The cylindrical curling path is preferably circular in cross-section, but can be slightly oval. The curling guide 94 defines an initial scroll space 97 initial film scroll axis or curling axis 96 that is parallel to but radially offset from the axis of rotation 90 of the inner roller 88. If the path defined by the curling guide 94, i.e., the curling path, is oval in cross-section (not shown); then the curling axis 96 is defined by the axis of a circular cylinder of the same cross-sectional area.

The curling axis 96 is internal to the supply chamber 20 and lower in the supply chamber 20 than the inner roller axis 90. The size of the initial scroll space 97 is directly related to the size of the final film scroll 98. It is therefore necessary that the initial scroll space 97 be sized to permit formation of a final film scroll 98 of a desired size. In a particular embodiment of the invention, the curling path or initial scroll space 97 is less than about 10 mm in diameter and the final scroll diameter is about 16 mm. A convenient initial scroll space 97 in that embodiment is from about 9.0 to about 9.5 mm. The inner roller 88 is necessarily smaller in diameter than the initial scroll space 97. A convenient inner roller 88 diameter in this embodiment is from about 7.0 to about 7.5 mm.

Figure 7:
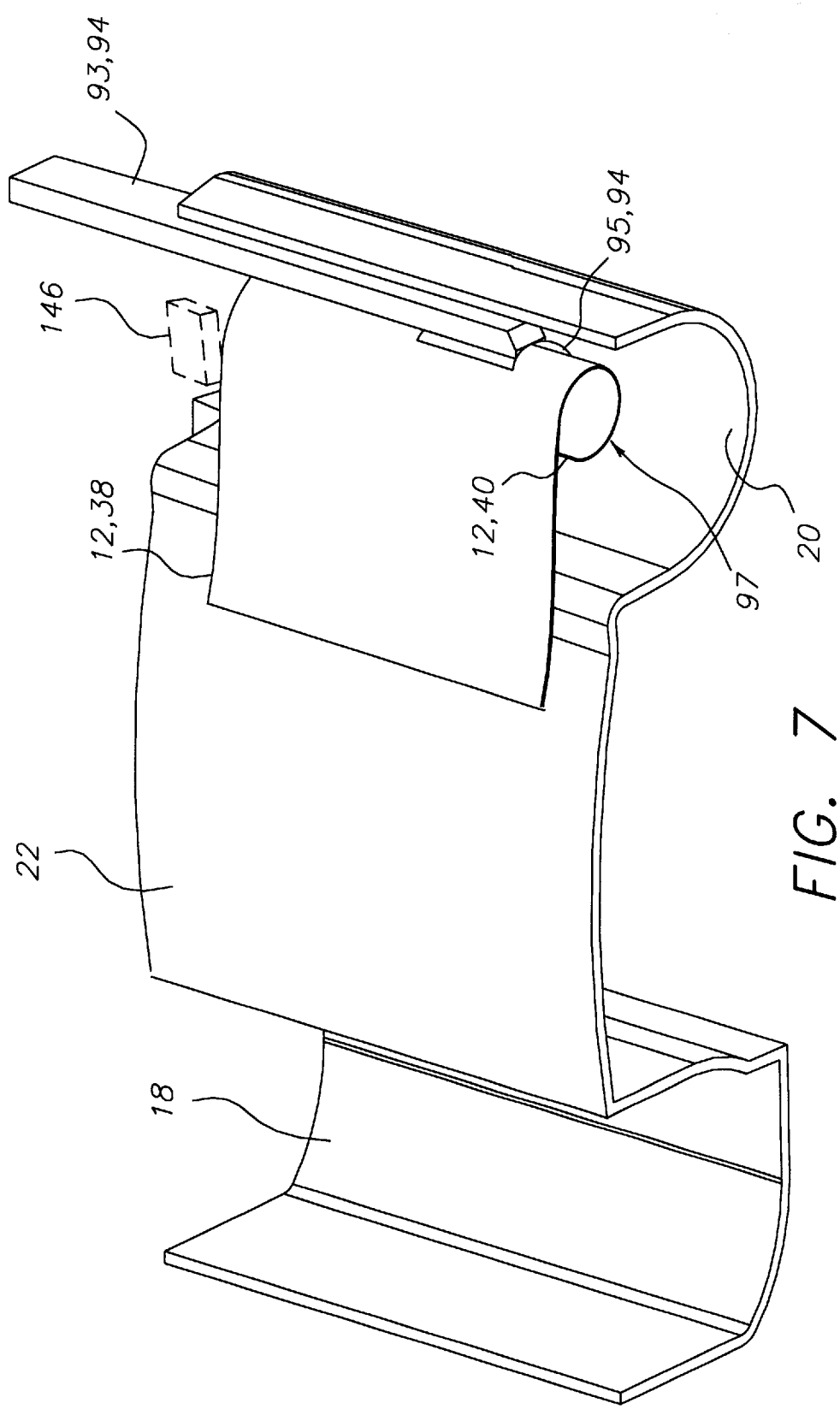
FIG. 7 is a semi-diagrammatical perspective view of the apparatus of FIG. 1 and a camera frame assembly during curling of the leading portion of the filmstrip to form and initial scroll. For clarity, the apparatus except for the curling guide is not shown and only part of the camera frame is shown. The cartridge and the filmstrip leading to the cartridge is also not shown. An optional stripper is indicated by dashed lines.
Figure 8:
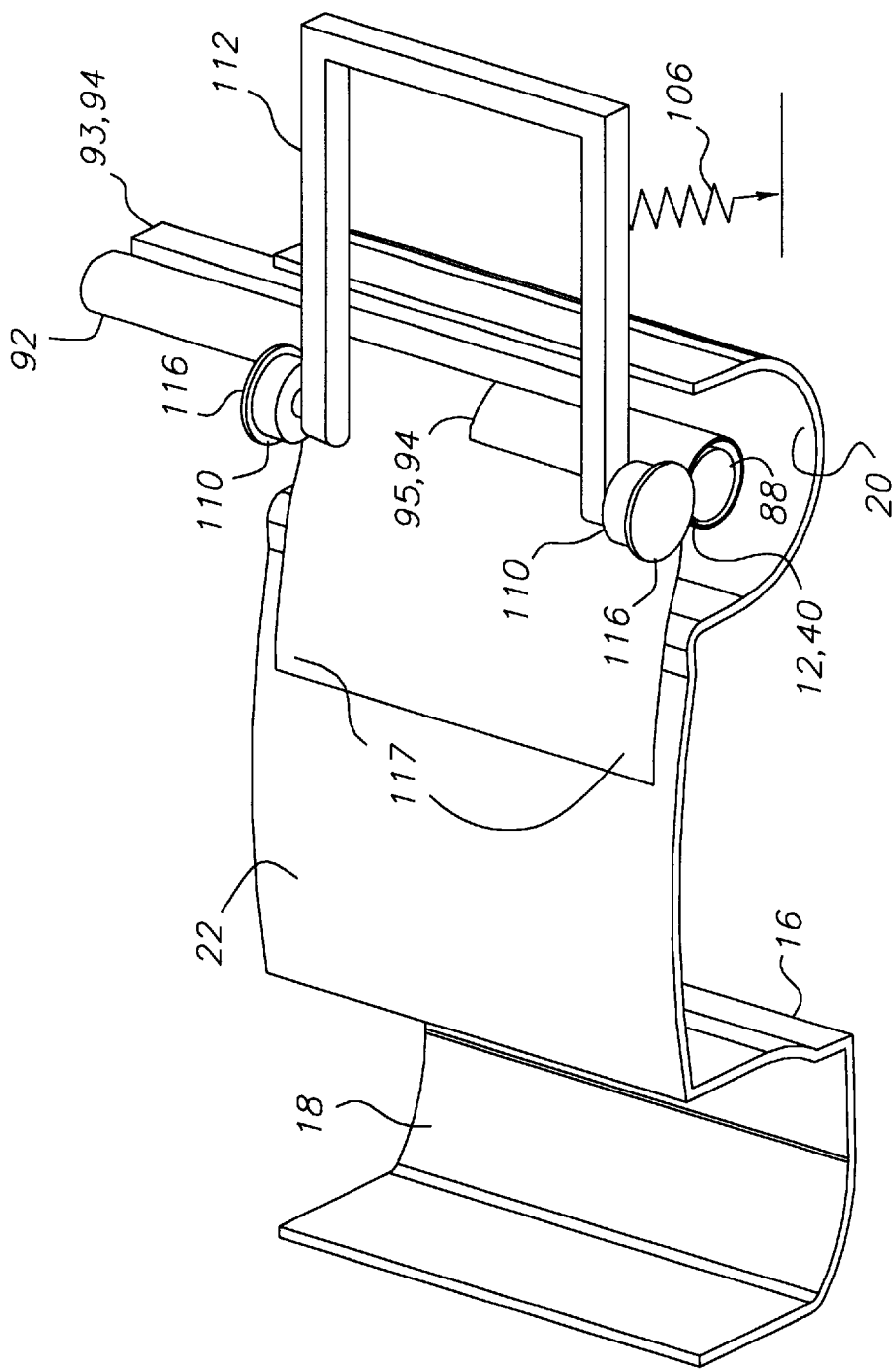
FIG. 8 is the same view of the apparatus and camera frame assembly during curling of the leading portion, as in FIG. 7, but the outer roller, pivot arm, and inner roller are also shown.
Figure 9:
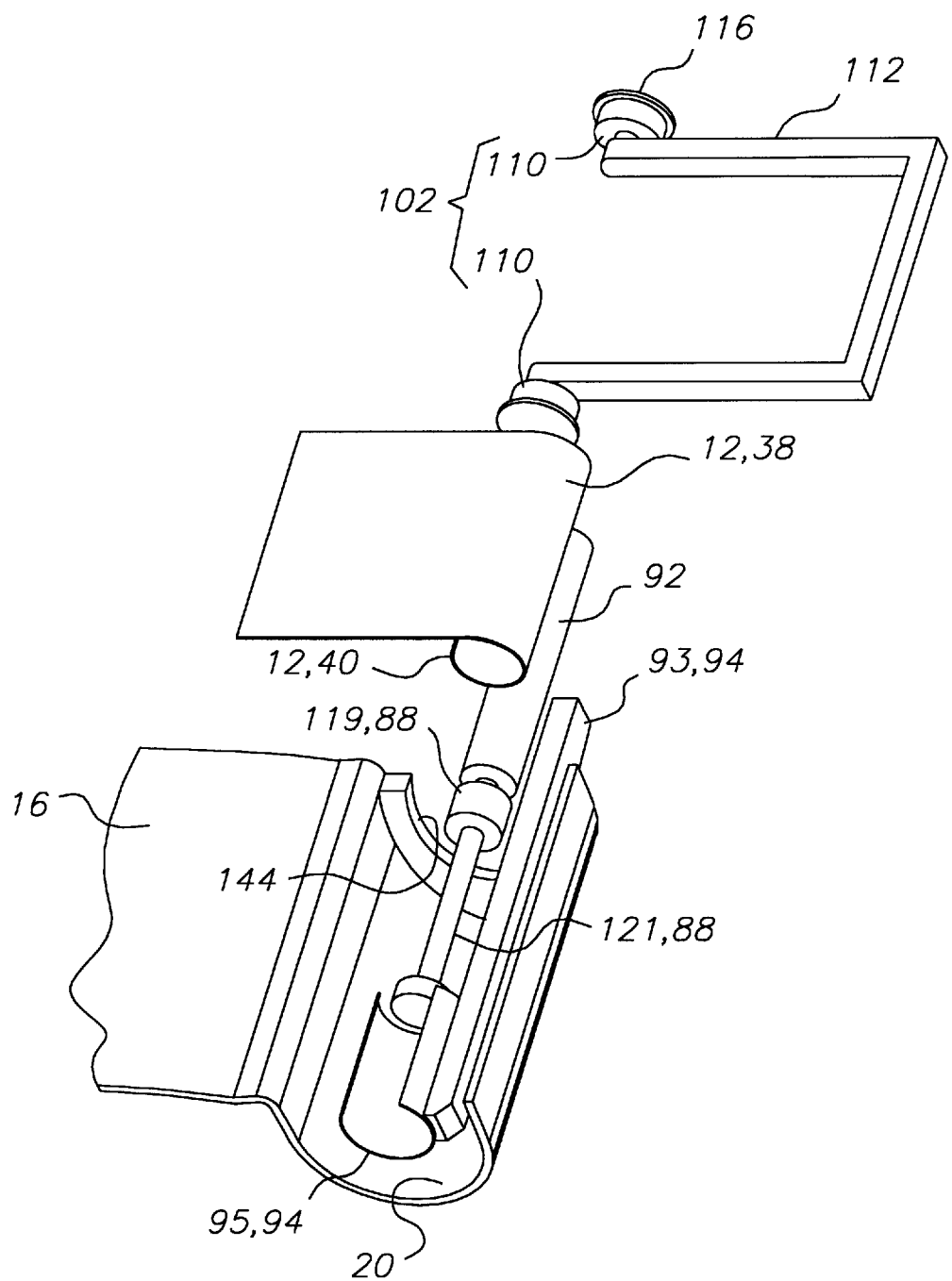
FIG. 9 is a partial exploded view of the apparatus of FIG. 8.
Figure 10:
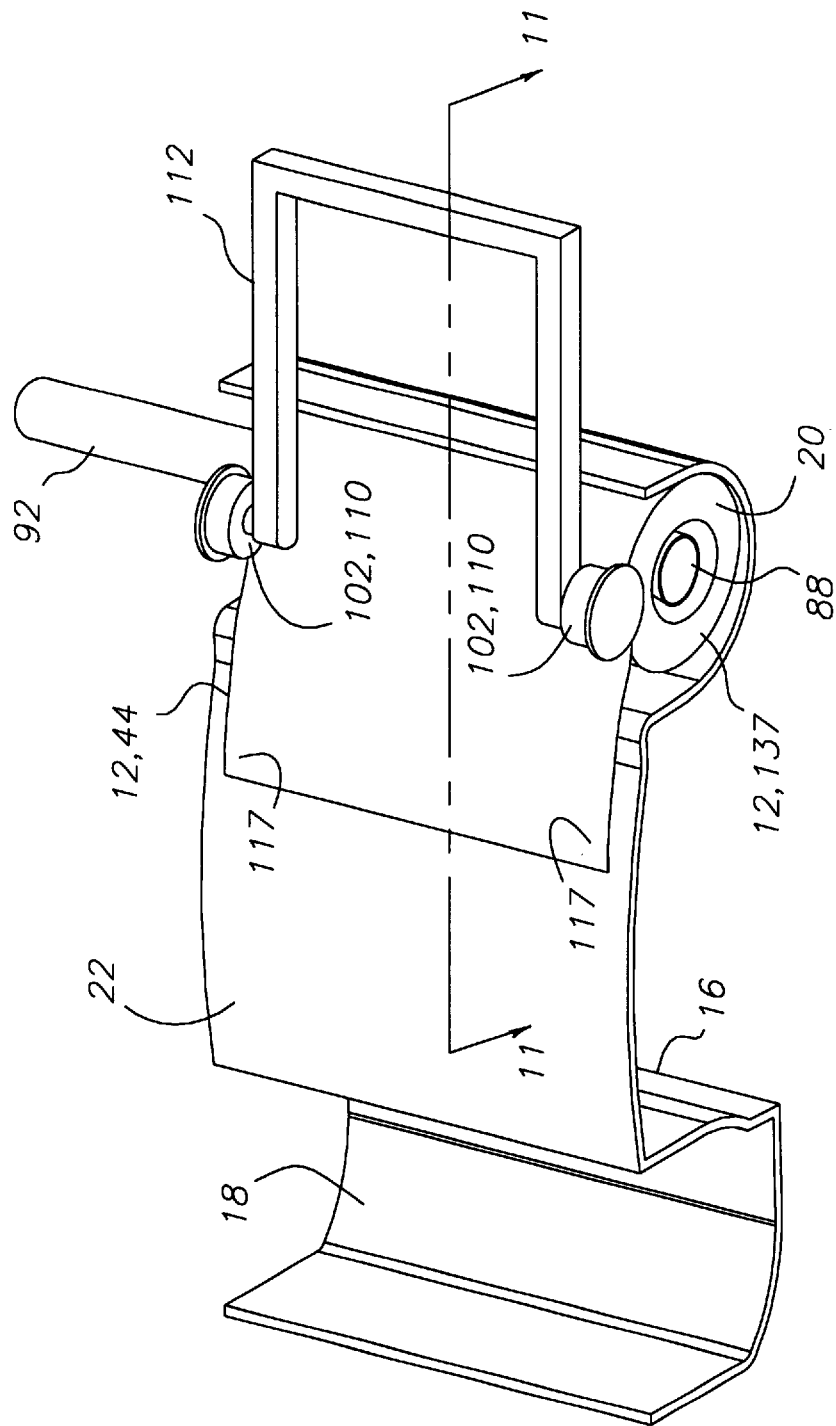
FIG. 10 is the same view of the apparatus and camera frame assembly as in FIG. 8, but after the completion of winding of the film scroll. The curling guide is not shown since the curling guide is withdrawn after formation of the initial film scroll.
Figure 11:
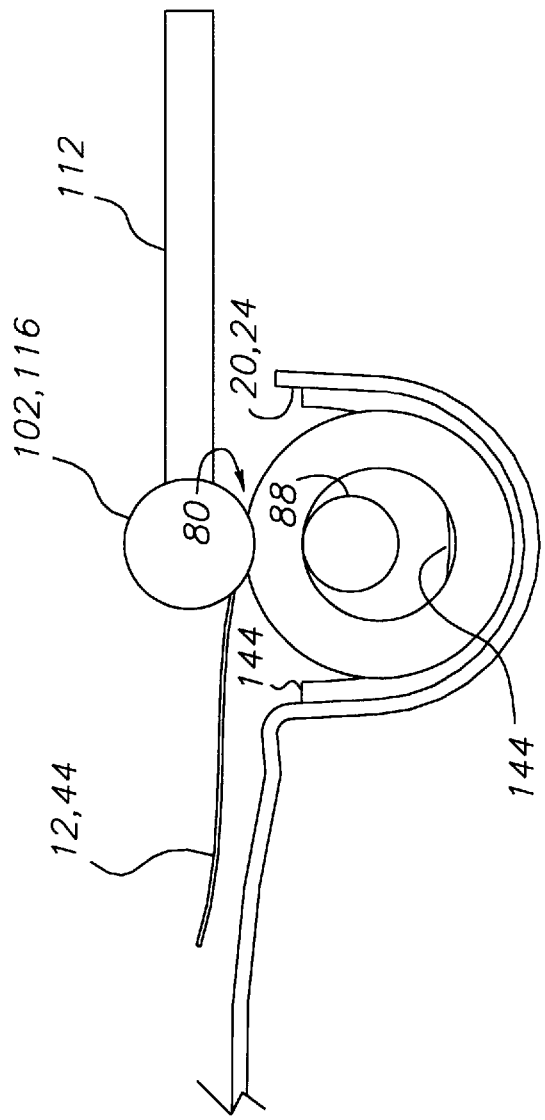
FIG. 11 is a semi-diagrammatical partial cross-sectional view of the apparatus of FIG. 10, taken substantially along line 11—11 of FIG. 10.
Figure 12:
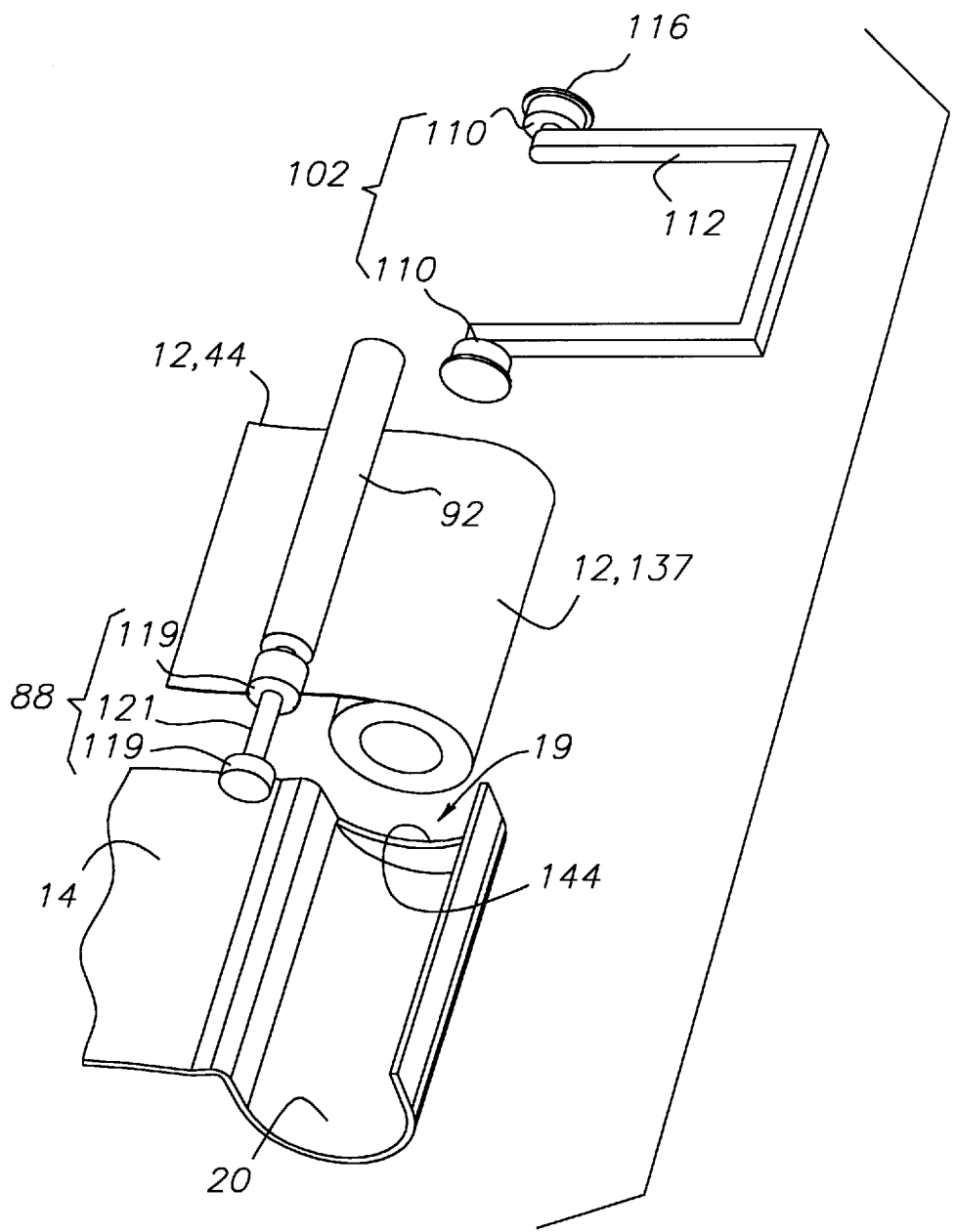
FIG. 12 is a partial exploded view of the apparatus of FIG. 11.
Figure 13A:
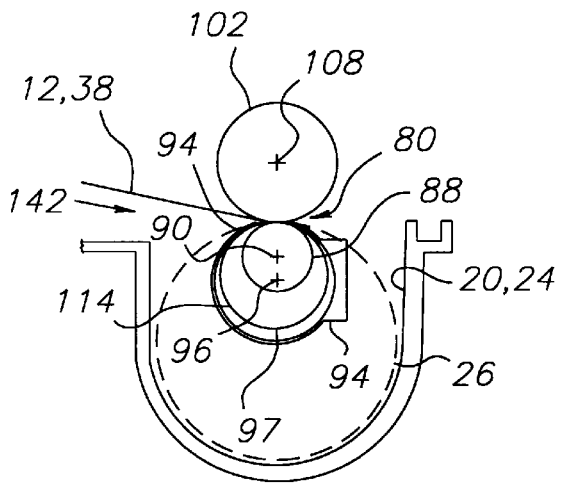
FIGS. 13a–13d are semi-diagrammatical partial cross-sectional views of the apparatus and camera frame assembly of FIG. 1, during curling, during two different stages of winding and after completion of scroll formation, respectively. The location of the film space is indicated by dashed lines in FIGS. 13a–13c. The position of the initial film scroll in FIG. 13a is shifted radially inward for clarity. The position of an optional blocking member is indicated by dashed lines in FIG. 13d.
Figure 13B:
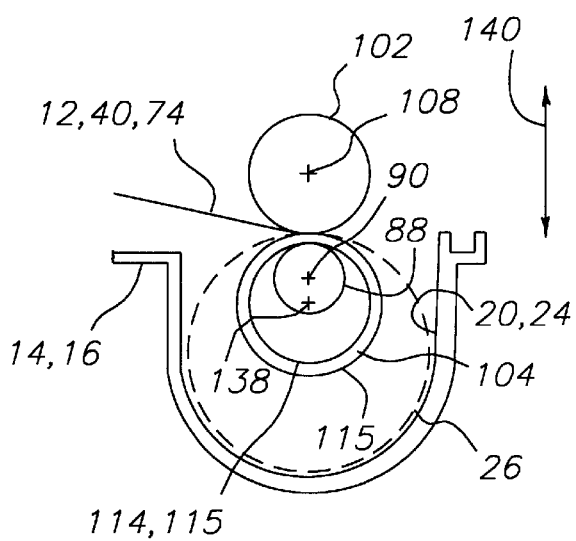
Figure 13C:
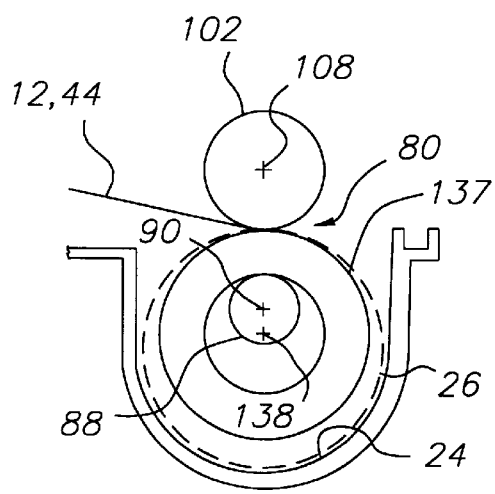
Figure 13D:
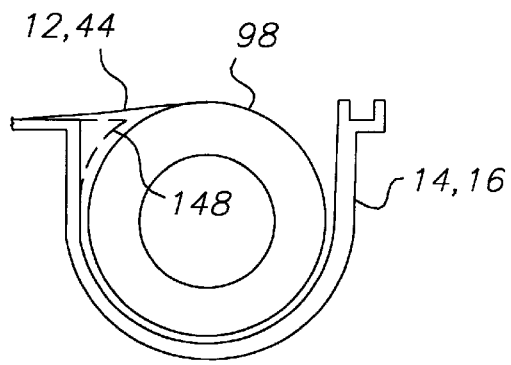

The curling guide 94 can be relatively simple. For example, in the embodiments of the invention shown in the figures, the curling guide 94 has a support arm 93 joined to a partial sleeve 95 extending over three hundred or more degrees of arc. The sleeve contacts only part of the width of the filmstrip, as shown in FIGS. 7–9. The curling guide 94 is positioned in the supply chamber 20 with the open portion of the partial sleeve adjoining the inner roller and the partial sleeve defining a curling path that includes the film gap 80.

The scroll former 86 includes an outer roller 102. The outer roller 102 is mounted to a locator 66 for movement between a rest position in spaced relation to the supply chamber 20 and a use position in which the outer roller 102 is disposed over the inner roller 88 (when the inner roller 88 is also in the use position). In the use position, the outer roller 102 is substantially tangent to the throat 17 of the supply chamber 20 and substantially parallel to the inner roller 88, and the outer and inner rollers 88,102 are spaced apart by and define the film gap or nip 80. The film gap 80 is described herein as if the rollers 88,102 were uniform in cross-section and completely incompressible. It will be understood, however, that part or all of the film gap 80 may form during use as a result of compression of the material of the inner or outer rollers 88,102, or both, against the filmstrip 12 and that part of the film gap 80 may be spaced apart from one or both rollers 88,102.

The outer roller 102 is lightly biased against the forming film scroll 104 (shown schematically in FIG. 8) by a biaser 106, such as a resilient band or spring or a suspended weight.

The film gap 80 is substantially parallel to the inner roller axis 90. It is highly preferred that the film gap 80 is also substantially parallel to the axis of rotation 108 of the outer roller 102. The film gap 80 has a thickness or dimension radial to the rollers 88,102 that is necessarily about the thickness of the forming film scroll 104.

The outer roller 102 can be a unitary piece or can have multiple segments 110. The segments 110 can rotate about different axes; however, it is highly preferred that all segments 110 rotate about a common axis 108, since this reduces the risk of telescoping and wobbling. In the embodiment shown in the figures, the outer roller 102 has two roller segments 110 that are mounted to a common pivot arm 112 and rotate about a common axis 108. The pivot arm 112 includes an appropriately positioned biaser 106 to urge the outer roller 102 toward the inner roller 88. The pivot arm 112 is convenient, but could be replaced by an equally convenient support 112 providing linear, rather than pivoting movement of the outer roller 102 against a biasing force. The biasing force applied by the biaser 106 is selected so that the friction between the inner roller 88 and the inner turn (indicated by reference numeral 114 in FIG. 13b) of filmstrip 12 is sufficient for the inner roller 88 to wind the film scroll 104 without substantial slippage. The biasing force is also large enough that the friction between adjacent turns or layers 115 of film scroll 104 prevents slippage between the layers 115. The friction between the turns 115 of filmstrip 12 must also be greater than the resistance to rotation of the rollers 88,102. Excessive biasing force is undesirable, since it is likely to cause bunching or cinching of the filmstrip or other filmstrip deformation.

In the embodiment shown in the figures, each segment of the outer roller 102 has a radially extending end flange 116. The end flanges 116 restrict telescoping or other lateral movement of the firm scroll 104 during formation. The end flanges 116 preferably closely receive the edges 117 of the filmstrip 12 with a separation only slightly larger than the transverse dimension (not shown) of the filmstrip 12. In the embodiment shown in the figures, each of the segments 110 of the outer roller 102 is freely rotatable, independent of the other segment 110 or the rate of rotation of the inner roller 88. Alternatively, the outer roller 102 can be driven, along with the inner roller 88, as long as the outer and inner turns of filmstrip 12 in the scroll are driven at the same angular velocity.

It is preferred that both inner and outer rollers 88,102 are centrally relieved or otherwise reduced in cross-sectional area toward the center and thus only grip the edges 117 of the filmstrip during film scrolling. This eliminates or largely curtails contact with the image area of the filmstrip 12. It is preferred that both rollers 88,102 have substantially uniform contact with the filmstrip 12 on both edges 117, since this reduces the risk of telescoping and other filmstrip distortion. In the embodiment shown in the figures, the inner roller 88 is centrally relieved and has the configuration of a pair of wheel shaped segments 119 joined by a shaft 121. The outer roller 102 is reduced to a pair of wheel-shaped segments 110. The materials, surface finishes, durometer, and other similar characteristics of the inner and outer rollers can be selected from those commonly used for photographic film transport rollers, well known to those of skill in the art.

The method of the invention is particularly suitable for prewinding film in one time use cameras; but is also suitable for prewinding reusable cameras marketed ready for use, that is, with a preloaded, prewound film cartridge. In the method of the invention, a film cartridge 30 is loaded into the cartridge chamber 18 of the camera frame assembly 14. The filmstrip 12 remains attached at one end to a spool 34 in the cartridge. After scrolling (discussed in more detail below), the filmstrip 12 extends from the cartridge, across the intermediate section 22 to the supply chamber 20, and the main portion 44 of the filmstrip 12 is a scroll 90 resting in the supply chamber 20.

Figure 15:
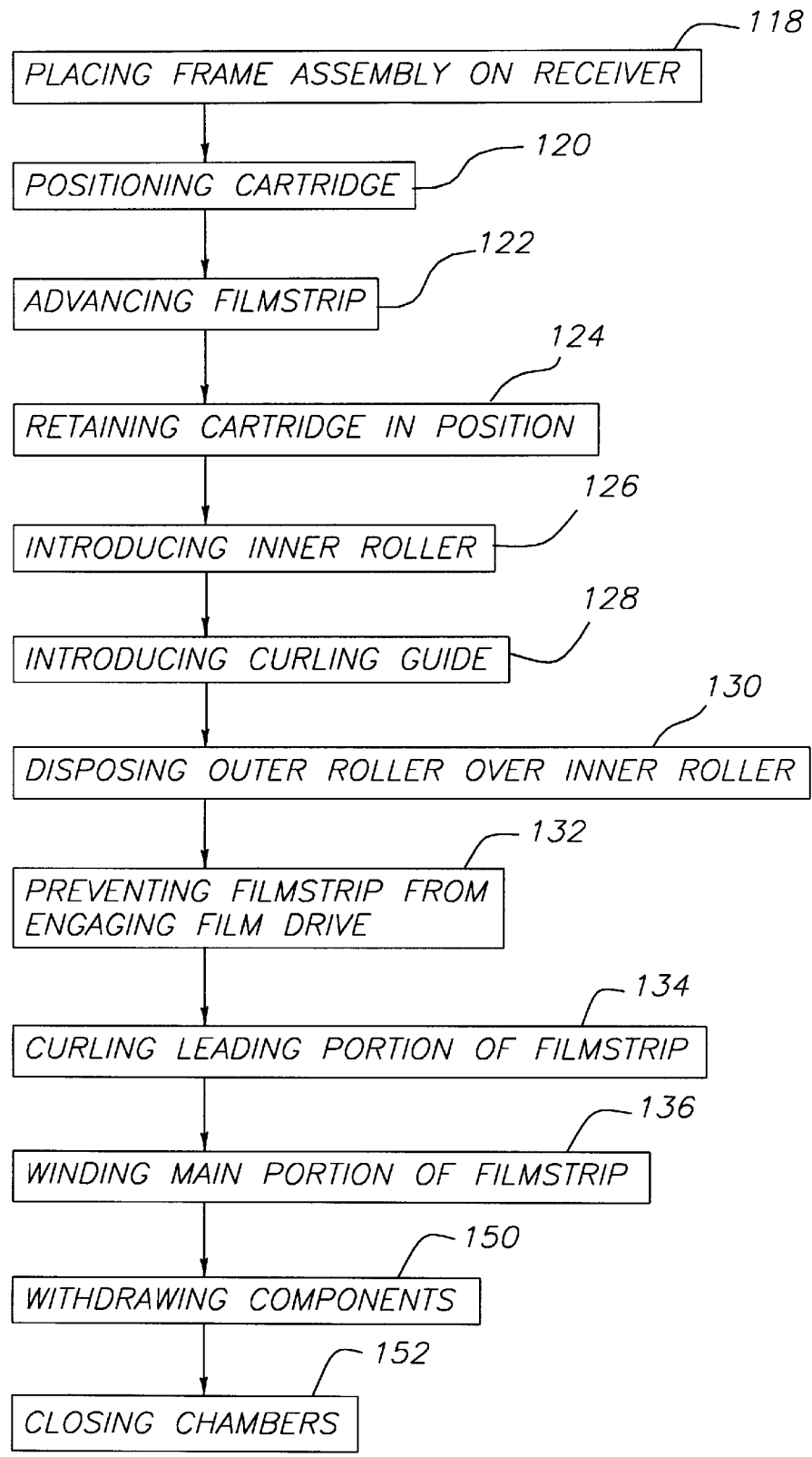
FIG. 15 is a flow chart of another embodiment of the method of the invention.

Referring now to the flow chart of FIG. 15 and the other figures generally, a camera frame assembly 14 is placed (118) on the receiver 54 of the apparatus 10 of the invention. The assembly 14 can be manufactured as a part of a continuous process with the method of the invention or can be manufactured in an independent process. As noted above, the camera frame assembly 14 can be premounted on a pallet 58. The camera frame assembly 14 can also be placed on a pallet 58 previously positioned on the receiver 54. After the frame assembly 14 has been placed on the receiver 54, a film cartridge 30 is positioned (120) in the cartridge chamber 18 of the frame assembly 14 and the filmstrip 12 is advanced (122) to the supply chamber 20.

Figure 6:
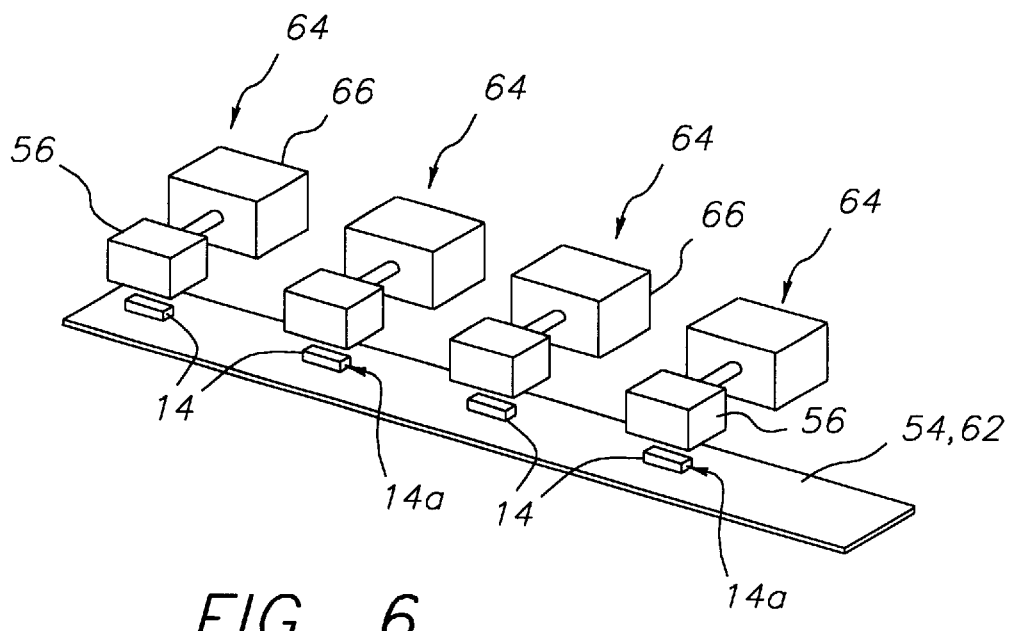
FIG. 6 is a semi-diagrammatical perspective view of still another embodiment of the apparatus of the invention.

In the embodiment of the invention also shown in FIG. 6, a film cartridge 30 is gripped and placed (120) in the cartridge chamber 18 of the camera frame assembly 14. The cartridge mover 68 can simply place a film cartridge 30 in the cartridge chamber 18 or can pick up a cartridge 30 from a supply (not shown), move the cartridge 30 to the cartridge chamber 18, and then continue to grip or otherwise retain (124) the cartridge 30 in position until film winding is completed. This is convenient if the camera frame assembly 14 lacks features to prevent oscillation or other movement of the film cartridge 30 during film winding. In a particular embodiment, the cartridge mover 68 has a vacuum gripper 70 to hold the cartridge. The cartridge mover 68 can support other components 56, such as an active light lock opener 72 and a spool rotator 82. The active light lock opener 72 is pivoted to open the active light lock of a suitable film cartridge 30, such as an Advanced Photo System™ (APS™) cartridge, prior to placement of the cartridge in the cartridge chamber site. This allows the camera frame assembly 14 to include a detent (not shown) which retains the active light lock in the open position during film use. The spool rotator 82 engages the spool 34 of the cartridge 30 and rotates the spool 34 to thrust the filmstrip 12 from the cartridge 30.

Next, the film scrolling apparatus 10 is moved into place relative to the camera frame assembly 14 or is otherwise placed in a use condition relative to the camera frame assembly 14. The inner roller 88 and curling guide 94 are introduced (126,128, respectively) into the supply chamber 20 and the outer roller 102 is disposed (130) over the inner roller 88 to define the film gap 80. Depending upon the film drive of the camera frame assembly 14, as discussed above, a film bridge 76 can be positioned over the intermediate section 22 of the frame 16. The filmstrip 12 is then advanced (122) by the film transport 78 from the cartridge 30 to the supply chamber 20 along the film path 74. In a particular embodiment of the invention, a film transport 78 has a quill that thrusts a filmstrip 12 out of the cartridge. The thrusting of the film can be continued until the free end 40 of the filmstrip 12 is impelled into the film gap 80. A detector 124 can be positioned to sense optically or in some other manner when the free end 40 reaches the film gap 80 and signal the controller (not shown) to stop thrusting. In other embodiments of the invention, the leading portion 38 of the filmstrip 12 is transported to the supply chamber 20 by the film bridge 76. In some embodiments, the film path 74 is spaced apart from the camera film drive 48 and thus, during film advancing, the filmstrip 12 is prevented (132) from engaging the film drive.

As the filmstrip 12 is advanced, the free end 40 of the leading portion 38 moves through the film gap 80, overlapping the inner roller 88, and initially contacts the curling guide 94. The free end 40 is pushed against the curling guide 94 and curls (134) in contact with the curling guide 94 until the free end 40 reenters the film gap 80 and forms the first turn or initial film scroll 114. The inner roller 88 can be driven at this time or can be allowed to freely rotate. If the latter, a sensor (not shown) can be provided to detect formation of the initial scroll 114. After the leading portion of the filmstrip 12 is guided back through the film gap 80, the curling guide 94 is retracted (136) from the supply chamber 20, preferably in a direction parallel to the curling axis 96. The forming film scroll 104 is next propelled by the driven roller or rollers 88,102 through the film gap 80, winding or wrapping (136) the main portion 44 of the filmstrip 12 over the initial turn to form the fully wound, gripped film roll 137 (shown in FIG. 13c). The outer roller 102 can be positioned over the inner roller 88 when the free end 40 of the filmstrip 12 is initially transported into the supply chamber 20 or can be placed in position after initial filmstrip 12 entry. It is preferred that the outer roller 102 is moved into active position in time for the rollers 88,102 to grip the initial scroll 114 as it forms.

The main portion 44 of the filmstrip 12 can be propelled to the film gap 80 by the film transport 78 or can be pulled by the rollers 88,102. Friction reduction can be provided on the film path 74. For example, air can be blown through holes in the vacuum/air belt 82 of a film bridge 76 to provide an air cushion. In any case, it is highly desirable that the filmstrip 12 have very low or zero tension at the film gap 80, such that the turns of filmstrip 12 do not slip relative to each other or the inner roller 88. Any increase in tension beyond a nominal zero tension increases the risk of film slippage and a resulting cinching of the filmstrip 12 about the inner roller 88.

The scrolling of the main portion 44 of the filmstrip 12 over the initial scroll 114 is accompanied by rotation of the scroll 104 as it forms about a scrolling axis 138 offset from the axis of the inner roller 88. In the embodiments of the invention shown in the figures, the scrolling axis 138 is initially coextensive with the curling axis 96, but moves away from the location of the curling axis 96 as the scroll builds. It is desirable that the scrolling axis 138 remain fixed or substantially fixed relative to the axis of rotation 90 of the inner roller 88 during scrolling; that is, it is desirable that the forming film scroll 104 not wobble or oscillate, or clock-spring during winding. It has been determined that, for the winding of 15 to 40 exposure rolls of Kodak APS™ film, marketed by Eastman Kodak Company, Rochester, N.Y., oscillation and clock-springing during winding was not observed at moderate winding speeds (winding the film roll within a time period of about 0.5 to 1.5 seconds). It is not expected that oscillation would be a problem unless a very pliant film was used. In that case one or more supplementary film guides (not shown) could be positioned in the supply chamber 20 adjoining the film scroll to damp oscillation. Such supplementary film guides can be idler rollers or otherwise provide a low friction contact with the film scroll. The use of such supplementary film guides is not preferred; however, because the supplementary film guides add cost and complexity, take up additional space, and present an additional risk of scroll deformation accompanied by film scuffing or other damage.

The thickness or radial dimension of the film gap 80 must increase during film scrolling to accommodate the growing film scroll 104. This can be accomplished in a number of different ways, for example, the inner and outer rollers 88,102 can both compress during scroll formation. It is preferred, however, that the scroll former 86 increase the separation of the inner and outer roller axes 90,108 during scroll formation, while at the same time maintaining the parallel relation of the axes 90,108. In an embodiment of the invention, the inner roller 88 is held in a constant position, relative to supply chamber 20, and the outer roller 102 is moved away from the inner roller 88. In another embodiment of the invention, the inner roller 88 is lowered into the supply chamber 20 during film winding (in the direction indicated by arrow 140 in FIG. 13b). The outer roller 102 remains in a constant positional relation to the supply chamber 20, throat 17, and film path 74. This approach has the advantage that the filmstrip 12 is continuously maintained in tangency between the apex or outermost turn of the film scroll 104 and the film entrance 142 or downstream end of the film bridge 76 so as to minimize the force applied to the filmstrip 12 during winding. Thus, in this embodiment, the axis of rotation of inner roller 88 is moved away from the axis of rotation of the outer roller 102 during winding, and deeper into the supply chamber 20.

Scrolling is continued until the main portion 44 of the filmstrip 12 has been wound over the initial film scroll 114, forming the fully wound, gripped film scroll 137. The remaining or trailing portion 42 of the filmstrip 12 remains attached to the spool 34 in the film cartridge 30 and after winding extends across the intermediate portion 22 to the final film scroll 98. The rotation of the rollers 88,102 is stopped before an excessive strain is placed on the trailing portion 42. This may be done in a variety of ways. For example, a sensor (not shown) can detect an increased load on the inner roller 88 due to reaching the trailing portion 42; or count rotation of the film spool 34 or another rotating part; or track the length or area of filmstrip 12 traveling to the film roll; or film can be wound for a predetermined time. With any of these approaches a slip clutch (not shown) can be provided in the inner roller drive 92 to accommodate excessive strain.

The film scroller 86 and other components 56 of the apparatus 10 of the invention are next withdrawn (150), relative to the camera frame assembly 14, which is then moved along for further processing. In embodiments of the invention having a film bridge 76, the camera frame assembly 14 is first displaced relative to the film bridge 76, and slack in the filmstrip 12 is taken up by scrolling a final portion of the filmstrip 12 or retracting that filmstrip portion back into the cartridge 30.

Removal of the film scroller 86 is accompanied by stripping the fully wound film scroll 137 off the inner roller 88. The fully wound film scroll 137 removes easily since it is not cinched; however, it is desirable that lateral movement of the fully wound film scroll 137 be prevented during withdrawal of the inner roller 88. This can be accomplished by blocking the lateral movement of the film scroll 137 with a partial end wall 144 of the supply chamber 20 or with a stripper. The stripper can be a part of the film scroller positioned to engage the final scroll as the inner roller 88 is withdrawn, as indicated by the dashed line 146 in FIG. 7. Since there is only slight contact between the film scroll 137 and inner roller 88, the exact dimensions of the stripper 146 are not critical. Contact with any portion of the film scroll 137 is sufficient to retain the film scroll 98 in place as the inner roller 88 is extracted. Movement of the film scroll can also be limited in other ways, for example, by gravity or inertia.

In a particular embodiment of the invention, the diameter of the fully wound film scroll 137 is close to the diameter of the supply chamber 20. This limits clockspringing when the rollers 88,102 are removed yielding the final film scroll 98. Clockspringing can be further limited, if desired, by the provision of a blocking member (indicated by dashed line 148 in FIG. 13d) on the camera frame 16 or scroll former 86.

Figure 14:
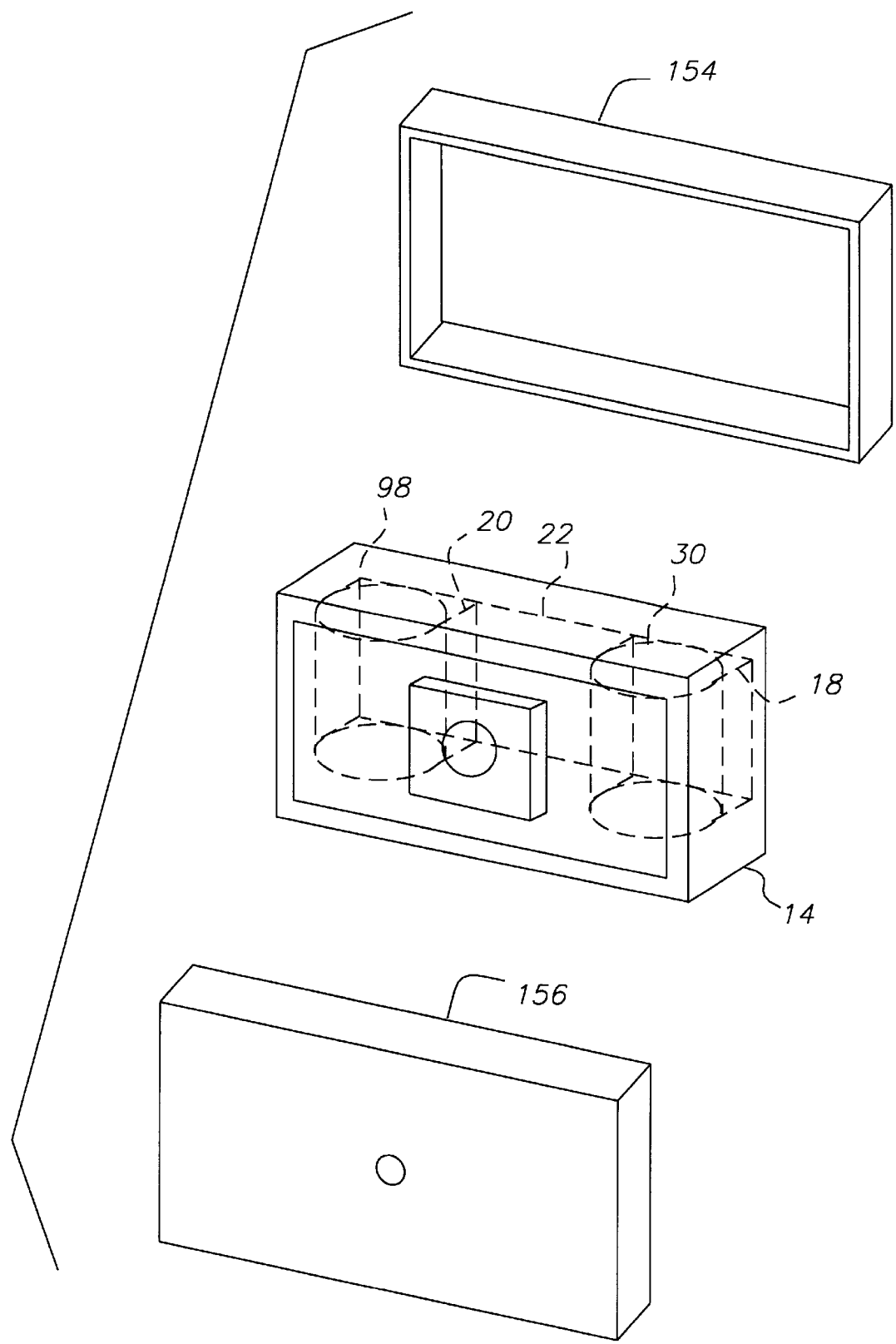
FIG. 14 is an exploded perspective view of a camera produced by an embodiment of the method of the invention.

After the scroll former 86 has been removed, the rear opening 28 of the camera frame assembly 14 is light-tightly closed (152). Referring now to FIG. 14, in a particular embodiment of the invention, this is accomplished by placing a light-tight rear cover 154 over the chambers 18,20 and intermediate section 22 and a light-tight front cover 156 over the camera frame assembly 14. The resulting camera assembly can be a completed camera or can be completed in further assembly operations. In addition to the features already discussed, including a film cartridge 30 and film scroll 90, the camera can also include other conventional camera features well known to those of skill in the art.

The apparatus and method of the invention have been described in terms of the formation of a film scroll within a supply chamber of a camera frame assembly. This is a particularly advantageous embodiment of the invention, since the apparatus does not require that the supply chamber be enlarged relative to the size of the finished film scroll to accommodate the apparatus and the film scroll does not have to be transported after it is formed. This also allows the film scroll to be wound to very close to its relaxed diameter after clock-springing. This reduces the risk of film damage during clock-springing and reduces the risk of the film acquiring a set or curling deformation in the tighter coil. The invention is not limited; however, to film scrolling using a camera frame assembly as the film holder. The film can be scrolled by the method of the invention in a canister, or shipping container or other non-camera film holder (not separately illustrated). The film can also be scrolled outside the camera frame assembly or other film holder and then loaded into the film holder. This approach adds a risk of film damage during the additional handing step or steps and adds an additional risk of damage during clock-springing; but does still provide the advantage that the film does not need to be cinched during winding.

The invention has been described in detail with particular reference to certain preferred embodiments thereof, but it will be understood that variations and modifications can be effected within the spirit and scope of the invention.

PARTS LIST apparatus 10
filmstrip 12
camera frame assembly 14
throat of cartridge chamber 15
camera frame 16
throat of supply chamber 17
cartridge chamber 18
side opening 19
supply chamber 20
intermediate section 22
interior wall 24
films space 26
rear opening 28
film cartridge 30
canister 32
spool 34
leading portion 38
free end 40
trailing portion 42
main portion 44
exposure system 46
camera film drive 48
film engagement member 50
receiver 54
components 56
double-headed arrow 57
pallet 58
indexing features 60
movement system 62
stations 64
actuation mechanism or locator 66
cartridge mover 68
vacuum gripper 70
active light lock opener 72
spool rotator 73
film path 74
film bridge 76
film transport 78
friction reducing features 79
film gap 80
belt 82 idlers 83
belt drive 84
vacuum-compressed gas unit 85
scroll former 86
inner roller 88
inner roller axis 90
inner roller drive 92
support arm 93
curling guide 94
partial sleeve 95
curling axis 96
initial scroll space 97
final film scroll 98
outer roller 102
forming film scroll 104
biaser 106
outer roller axis 108
segments 110
pivot arm 112
inner turn or initial film scroll 114
turns 115
end flange 116
edges 117
placing frame assembly on receiver (118)
wheel shaped segments 119
positioning cartridge (120)
shaft 121
advancing filmstrip (122)
retaining cartridge in position (124)
introducing inner roller (126)
introducing curling guide (128)
disposing outer roller over inner roller (130)
preventing filmstrip from engaging film drive (132)
curling leading portion of filmstrip into initial film scroll (134)
winding main portion (136)
fully wound, gripped film roll 137
scrolling axis 138
arrow 140
film entrance 142
partial end wall 144
stripper 146
blocking member 148
withdrawing components (150)
closing (152)
rear cover 154
front cover 156

What is claimed is:

1. A method for loading photographic film, comprising the steps of:
introducing a curling guide into a supply chamber of a film holder;
introducing an inner roller into said supply chamber, said inner roller defining an inner roller axis and a film gap overlying said inner roller;
disposing an outer roller over said inner roller adjoining said film gap;
advancing a leading portion of a filmstrip through said film gap;
curling said leading portion around said inner roller and back to said film gap to define an initial filmstrip scroll, said initial scroll having an axis offset from said inner roller axis;
retracting said curling guide after said curling step;
propelling a main portion of said filmstrip through said film gap to wind said main portion of said filmstrip over said initial scroll;
removing said rollers; and
light-tightly closing said film holder.

2. A method for loading photographic film, comprising the steps of:
positioning a film cartridge in a cartridge chamber of a camera frame assembly having said cartridge chamber, a supply chamber, and an intermediate section between said chambers, said film cartridge including a spool and a filmstrip, said filmstrip having a leading portion, a main portion and a tail portion;
introducing a curling guide into said supply chamber;
introducing an inner roller into said supply chamber, said inner roller defining an inner roller axis and a film gap overlying said inner roller;
disposing an outer roller over said inner roller adjoining said film gap;
advancing said leading portion of said filmstrip out of said cartridge and through said film gap;
curling said leading portion around said inner roller and back to said film gap to define an initial filmstrip scroll, said initial scroll having an axis offset from said inner roller axis;
retracting said curling guide after said curling step;
propelling said main portion of said filmstrip through said film gap to wind said main portion of said filmstrip over said initial scroll;
removing said rollers; and
light-tightly closing the camera frame assembly.

3. The method of claim 2 wherein said filmstrip is free from cinching to said inner roller during said curling and propelling steps.

4. The method of claim 2 wherein said driving step further comprises propelling said main portion of said filmstrip through said film gap with said rollers, to wind said main portion of said filmstrip over said initial scroll.

5. The method of claim 4 wherein said driving step further comprises driving said inner roller and said outer roller.

6. The method of claim 5 wherein said inner roller and said outer roller are driven at the same speed.

7. The method of claim 2 further comprising moving said inner roller further into said supply chamber during said propelling.

8. The method of claim 7 further comprising maintaining said outer roller in substantially fixed relation to said supply chamber during said propelling.

9. The method of claim 2 further comprising restricting lateral movement of said filmstrip during said propelling.

10. The method of claim 2 further comprising gripping only the lateral margins of said film during said propelling.

11. The method of claim 2 wherein said curling guide is a partial sleeve and said curling step further comprises pushing said leading portion against said curling guide.

12. The method of claim 2 wherein said camera frame assembly defines a rear opening over said chambers and said intermediate section and said method further comprises closing said rear opening following said allowing step.

13. The method of claim 2 further comprising, prior to said positioning step, opening an active light lock of said film cartridge.

14. The method of claim 2 further comprising retaining said cartridge in said camera frame assembly during said propelling step.

15. A film loading apparatus, for use with a film holder and a filmstrip having a leading portion and a main portion, said apparatus comprising:

an inner roller having an inner roller axis of rotation;

an inner roller drive operatively connected to said inner roller, said inner roller drive rotating said inner roller about said inner roller axis of rotation;

a curling guide defining a cylindrical curling path having a curling axis offset from said inner roller axis, said curling guide being movable between a first position offset from said inner roller in a direction axial to said inner roller axis and a second position paralleling said inner roller;

an outer roller disposable over said inner roller in closely spaced relation defining a film gap between said inner and outer rollers, said outer roller having an outer roller axis of rotation at least substantially parallel to said inner roller axis; and a film transport disposed to propel said leading portion of said filmstrip to said film gap.

16. The apparatus of claim 15 wherein said film gap is substantially tangent to said curling path.

17. The apparatus of claim 15 further comprising means for biasing said outer roller toward said inner roller.

18. The apparatus of claim 15 further comprising a repositioner connected to said inner roller, said repositioner lowering said inner roller relative to said outer roller during rotating of said inner roller.

19. A film loading apparatus, for use with: a camera frame assembly including a camera frame having a cartridge chamber, a supply chamber, and an intermediate section disposed between said chambers; and a film cartridge disposed in said cartridge chamber, said film cartridge having a case and a filmstrip, said filmstrip having an leading portion, a main portion and a tail portion; said film loading apparatus comprising:

a receiver for the camera frame assembly, said receiver defining sites for said chambers and said intermediate section;

a curling guide movable between a first position outside said supply chamber and a second position inside said supply chamber;

an inner roller movable between a rest position outside said supply chamber and a use position inside said supply chamber independent of said curling guide;

an outer roller disposable over said inner roller when said inner roller is in said use position, said outer roller and said inner roller defining a film gap between said inner and outer rollers;

a film transport disposed to propel said leading portion of said filmstrip from said case to said film gap; and a roller drive rotating said inner and outer rollers.

20. The apparatus of claim 19 wherein said curling guide defines an initial film scroll axis offset from the axis of rotation of said inner roller.

21. The apparatus of claim 19 wherein both said rollers are centrally relieved.

22. The apparatus of claim 19 wherein said outer roller has a pair of spaced apart roller segments, said segments each having a common axis of rotation.

23. The apparatus of claim 19 wherein said outer roller has a pair of radially extending end flanges, said end flanges having a separation substantially equal to the transverse dimension of said filmstrip.

24. The apparatus of claim 19 wherein said curling guide is a partial sleeve.

25. The apparatus of claim 24 wherein said curling guide and said inner roller define an initial scroll space less than about 10 mm in diameter.

* * * * *